United States Patent [19]

Johansson

[11] 4,435,356
[45] Mar. 6, 1984

[54] METHOD AND AN APPARATUS FOR MONITORING THE PERIOD OF A NUCLEAR REACTOR

[75] Inventor: Lars O. Johansson, Nyköping, Sweden

[73] Assignee: Studsvik Energiteknik AB, Nyköping, Sweden

[21] Appl. No.: 261,696

[22] Filed: May 8, 1981

Related U.S. Application Data

[63] Continuation of Ser. No. 17,267, Mar. 5, 1979, abandoned.

[51] Int. Cl.$^3$ .............................................. G21C 7/36
[52] U.S. Cl. ..................................... 376/216; 376/215
[58] Field of Search ............... 376/215, 216, 248, 254, 376/249, 259; 364/504

[56] References Cited

U.S. PATENT DOCUMENTS 3,931,522  1/1976  Rusch .................................. 376/215
3,979,255  9/1976  Bulgier ................................ 376/216

Primary Examiner—Donald P. Walsh
Attorney, Agent, or Firm—Abelman, Frayne & Rezac

[57] ABSTRACT

When monitoring the period of a nuclear reactor, a signal representing the reactor power is generated and compared with a reference signal. When a difference between the power signal and the reference signal is detected, the level of the reference signal is changed at a predetermined rate independent of the magnitude of said difference in a direction to reduce said difference. Hereby the reference signal is brought to follow the power signal as long as the latter does not change faster than said predetermined rate of change for the reference signal. At least one warning level signal is generated, the level of which being equal to the instant level of the reference signal multiplied by a predetermined factor greater than one. The power signal is compared also with this warning level signal, and a warning signal is generated when the level of the power signal becomes equal to or exceeds the level of said warning level signal.

2 Claims, 3 Drawing Figures

METHOD AND AN APPARATUS FOR MONITORING THE PERIOD OF A NUCLEAR REACTOR

This is a continuation of application Ser. No. 17,267 filed Mar. 5, 1979 now abandoned.

The invention relates to a method and an apparatus for monitoring the period, or time constant, of a nuclear reactor.

When commissioning and starting-up a nuclear reactor, the power increase follows a course which is substantially exponential. The period, or time constant, of this exponential function must not be too short, and it must therefore be monitored. Monitoring must take place over a power range extending over several powers of ten.

According to a conventional method, the period of a reactor is monitored by a period meter connected to the output of a logarithmic measuring channel. In conjunction with the development of a new SRM-IRM system for power reactors, a need for carrying out a corresponding monitoring of a linear measuring channel has arisen. The present invention intends to fill this requirement. The invention is especially suitable for period monitoring, when the power signal is divided up into a number of linear ranges, such as is the case with the IRM portion of said SRM-IRM system, for example, but the apparatus according to the invention can also replace a period meter of conventional design.

The letters SRM and IRM designate "source range monitor" (SRM) and "intermediate range monitor" (IRM), respectively. To monitor the reactor period a signal is generated in a known way, this signal being designated "power signal", the level of which varies linearly with the reactor effect. This power signal is compared with a reference signal, and a warning signal is generated in response to the result of said comparison.

The method according to the invention is characterized in that when a difference between the power signal and the reference signal is detected, the level of the reference signal is changed at a predetermined rate independent of the magnitude of said difference in a direction to reduce said difference, whereby the reference signal is brought to follow the power signal as long as the latter does no change faster than said predetermined rate of change for the reference signal; that at least one warning level signal is generated, the level of which being equal to the instant level of the reference signal multiplied by a predetermined factor greater than one; and that the power signal is compared also with this warning level signal, said warning signal being generated when the level of the power signal becomes equal to or exceeds the level of said warning level signal.

The apparatus for monitoring the period of a nuclear reactor comprises means for generating a power signal representing the instant power of the reactor, means for generating a reference signal and circuitry for comparing the power signal with the reference signal and for generating a warning signal in response to said comparison. The apparatus according to the invention is characterized in that said reference signal generating means can be controlled to increase or decrease the level of the reference signal at a predetermined rate in respone to a first control signal and a second control signal, respectively, and that said signal comparing circuitry comprises a first signal comparator for comparing the power signal with the reference signal and for generating respectively said first control signal for said reference signal generating means when the level of the power signal exceeds the level of the reference signal and said second control signal for said reference signal generating means when the level of the power signal is below the level of the reference signal, a warning level source connected to the reference signal generating means and adapted to generate a warning level signal, the level of which being equal to the instant level of the reference signal multiplied by a predetermined constant factor, and a second signal comparator for comparing the power signal with said warning level signal and for generating the warning signal when the level of the power signal becomes equal to or exceeds the level of the warning level signal.

The invention will now be described while referring to the attached drawings.

Figure 1:
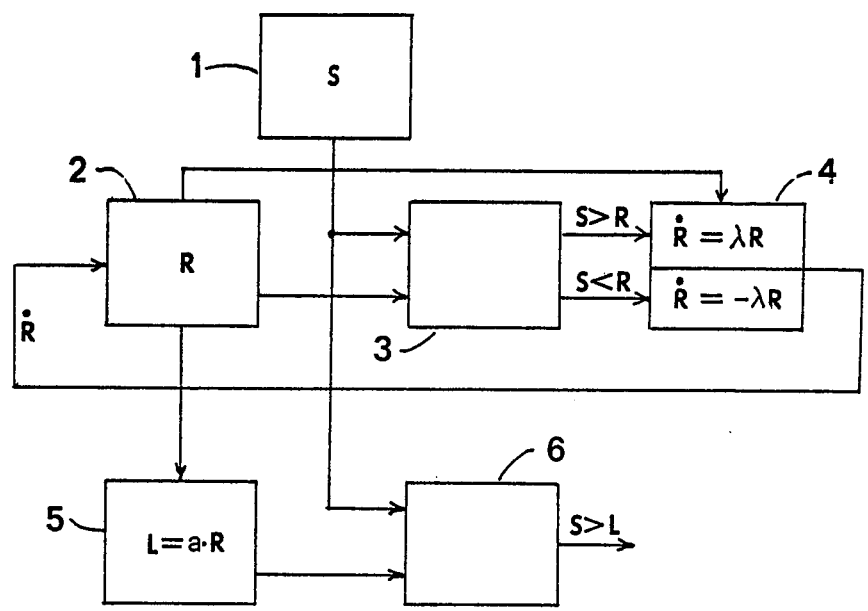
FIG. 1 shows a block diagram of an apparatus according to the invention.

The apparatus according to FIG. 1 includes a signal source 1, sensing the reactor power in a known way and generating a power signal S, which is proportional to the reactor power. The apparatus further includes a reference signal source 2, generating a reference signal R. The power signal S and the reference signal R are applied to a first comparator 3, which delivers a certain output signal if the power signal S is greater than the reference signal R, and another outout signal if the power signal S is less than the reference signal R. The output signal from the comparator 3 is applied to a control signal source 4, to which also the reference signal is applied. The control signal source generates an output signal, the polarity of which is positive or negative in response to whether the difference between the power signal and reference signal decided by the comparator 3 is positive or negative, and the absolute value of which is equal to the instantaneous value R of the reference signal multiplied by a fixed constant $\lambda$. This output signal is applied to the reference signal source 2 and controls the reference signal so that the latter attempts to follow the variations in the power signal. The output signal ($+\lambda R$ or $-\lambda R$) from the control signal source 4 represents the time derivative $\dot{R}$ of the reference signal, and this will thus be an exponential function of the time. If S is greater than R, i.e. $\dot{R} = \lambda R$, then R increases exponentially, and if S is less than R, i.e. $\dot{R} = -\lambda R$, then R decreases exponentially. The constant $\lambda$ is selected so that the time derivatives of the reference signal will be greater than those of the power signal for all normal cases. This means that the reference signal can keep up with the power signal, and the reference signal is approximately equal to the power signal if the latter increases with a time constant which is less than or equal to the maximum permitted.

A second signal source 5, denoted "warning level signal source", is connected to the reference signal source 2. The signal source 5 generates a signal L, the level of which is always a constant multiple a of the reference signal level, i.e. $L = aR$. The warning level signal L is supplied, together with the power signal S, to a second comparator 6. This transmits an output signal if the power signal level exceeds that of the warning level signal. This output signal can be designated "warning signal" and is utilized for triggering optical and/or acoustic warning means for drawing the attention of operators, so that suitable measures can be taken to decrease or stop the power increase. The warning signal can also be utilized for directly actuating automatically operating devices for regulating the reactor power.

Figure 2:
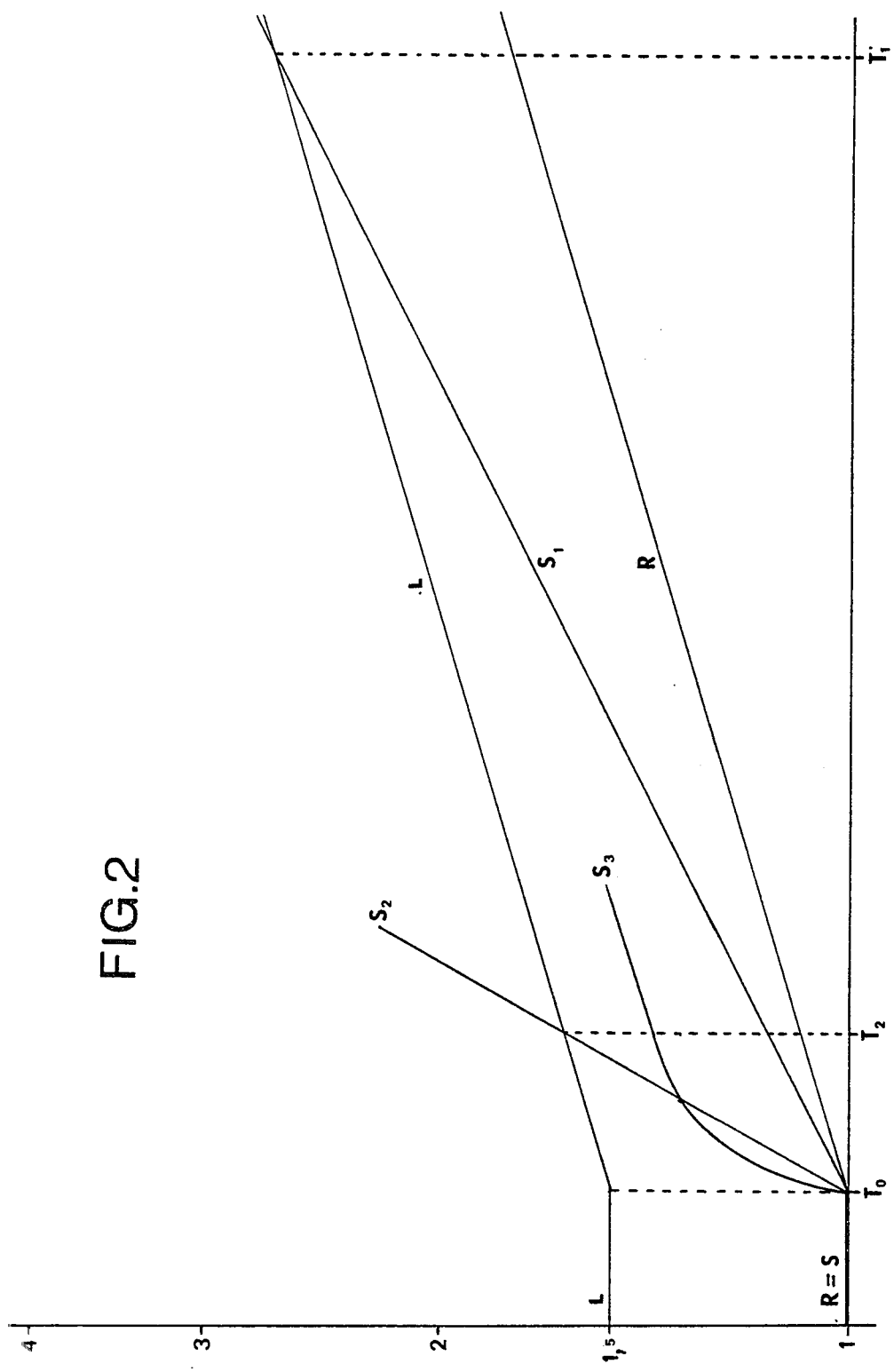
FIG. 2 shows a diagram illustrating the function of the apparatus according to FIG. 1.

The function of the apparatus is illustrated on the diagram in FIG. 2 for some conceivable signal courses. The diagram shows signal levels (to a logarithmic scale) as a function of time. The constant a, denoting the relationship between the warning level signal and the reference level signal, has been optionally selected as 1.5, so that $L=1.5R$. Before the time $T_0$ the power level is stable and $R=S$, but after the time $T_0$ the power signal has an impermissibly high derivative, so that it deviates increasingly from the reference level. The power signal varies according to the graph $S_1$ for a modest excess of the permitted doubling rate. At time $T_1$ the power signal exceeds the warning level L, and the power signal level has thereby increased considerably more than the factor a. For a more rapid increase of the power signal according to the graph $S_2$, warning is already triggered after a shorter time $T_2$, and also at a lower level. If the power signal after the time $T_0$ has a transient course according to the graph $S_3$, no warning is triggered, since the amplitude of the signal is less than a.

The apparatus described here has the following advantages:

In normal operation, the warning level accompanies the power signal and is always a factor a above it.

A very rapid power increase gives warning when the signal has increased by a factor a.

For a modest excess of permitted power increase rate, the power signal increases more than the factor a, since the warning level is rising.

Reactor excursions of short duration are permitted, and their permitted amplitude is greater, the slower they are.

The apparatus can be supplemented by several signal sources, corresponding to the signal source 5 in FIG. 1, to generate several different warning level signals with different values of the factor a. Several different warning levels are hereby obtained, indicating different power increase rates.

Figure 3:
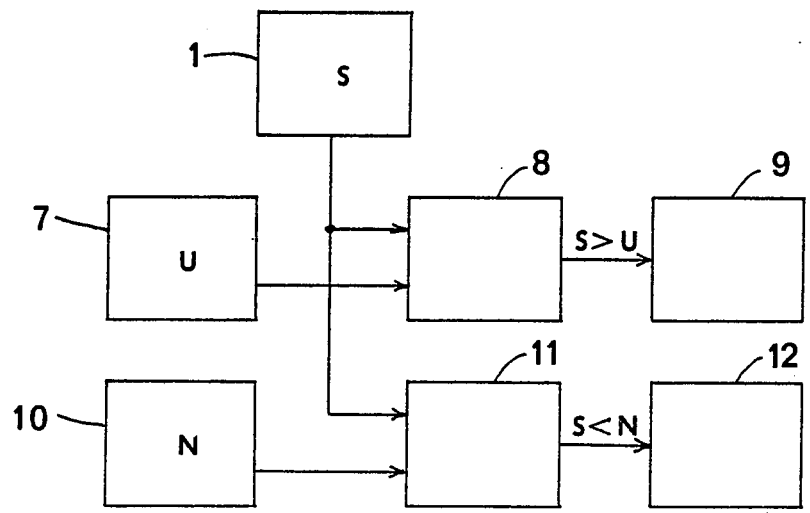
FIG. 3 shows a block diagram of an apparatus for changing the signal levels.

In the form of a block diagram in FIG. 3, there is shown an apparatus enabling automatic switching of the measuring ranges. Such switching means that the levels of the power signal and reference signal are decreased or increased when the reactor power increases from a lower to a higher power interval, or decreases from a higher to a lower power interval, so that the measuring range of the measuring channel, this measuring range being considerably less than the entire variation range of the reactor power, can be utilized for all power intervals. These power intervals suitably correspond to different powers of ten, i.e. units of 0–10, 10–100, 100–1000 etc. The available measuring range of the power channel thereby corresponds to 0–10 units. The proportionality factor, giving the relationship between the power signal and reactor power, must be adjusted so that the power signal level is always within this range. This means that if the reactor power increases from one interval (e.g. 0–10) to the nearest higher interval (10–100), then said proportionality factor must be reduced to one-tenth of the previous value. If, on the other hand, the reactor power sinks from a higher interval to the nearest lower interval, then the proportionality factor must be increased so that it is ten times greater than before. This can be achieved by the apparatus according to FIG. 3.

The apparatus according to FIG. 3 is, as shown in the figure, connected to the signal source 1 for generating the power signal S. The apparatus includes a first signal source 7 for generating a signal U, which indicates the upper limit for the measuring range. The signal U from the source 7 is applied to a comparator 8, to which the power signal S is also applied. The comparator 8 generates on output signal if the signal S exceeds signal U. This output signal is applied to a switching means 9. The switching means 9 is connected, in a way not shown, to the signal sources 1 and 2 (FIG. 1) and actuates the output signal level for these two signal sources so that respective signal levels are reduced to a fraction, e.g. one-tenth, of the previous level.

A second signal source 10 emits an output signal N, the level of which corresponds to a fraction (one-tenth or less) of the available measuring range. The output signal N from the signal source 10 is applied to a comparator 11, to which the power signal S is also applied. The comparator 11 transmits an output signal when the signal S is less than the signal N. This output signal is applied to a second switching means 12. The switching means 12 is also connected to the signal sources 1 and 2 (FIG. 1). When the switching means 12 is actuated by an output signal from the comparator 11, it provides an increase of the output signal level for the signal sources 1 and 2, so that the levels of the power and reference signals are increased to a multiple (10) of the previous level. The switching means 9 and 12 can, for example, be made to actuate voltage dividers on the outputs of the signal sources 1 and 2.

By altering both the power signal S and the reference signal R (and thereby the warning level signal L) in the same way at these level changes, the common relationship between these signal levels will remain unaltered after a level change.

The signal level N for the signal from the signal source 10 should be selected so that it is somewhat lower than the level corresponding to the junction between a higher power range and the nearest lower one. If thus the power range is divided up into decadic intervals, the signal level N should be somewhat smaller than one-tenth, e.g. 0.08 of the level range of the measuring channel. If the signal level N were exactly one-tenth of this level range, and the power signal level were at the upper limit for this range, remaining there for a certain time, or varying somewhat about it, both the switching apparatuses 9 and 12 could be actuated simultaneously or in rapid succession (the apparatus would not "know" which level range it should select), which is undesirable.

The apparatuses shown schematically in the form of blocks in FIGS. 1 and 3 can be realized in a manner known per se, with either analogue or digital circuits, and are therefore not described in detail.

The apparatus can naturally be combined with optical indicating means, e.g. conventional dial instruments enabling an operator to read off the reactor power or period directly.

I claim:

1. A method of monitoring the period of a nuclear reactor, wherein a power signal representing the power of the reactor is measured and is continuously compared with a reference signal, and a warning signal is generated in response to the result of said comparison, characterized in that when a difference between the power signal and the reference signal is detected, the value of the reference signal is multiplied by a fixed constant, the polarity of which is dependent upon the difference between the power signal and the reference signal to reduce said difference, whereby the multiplied reference signal is fed back to generate a new reference signal describing an exponential function of the time to be compared with the power signal, that the reference signal is brought to follow the power signal as long as the latter does not change faster than a predetermined rate of change for the reference signal, that at least one warning signal is generated, the value of which being equal to the instant level of the reference signal multiplied by a predetermined factor greater than one, and that the power signal is compared also with this warning signal, said warning signal being generated when the value of the power signal becomes equal to or exceeds the value of said warning signal to provide a short response time to a rapid increase of the power signal.

2. An apparatus for monitoring the period of a nuclear reactor, comprising means for measuring a power signal representing the instant power of the reactor, means for generating a reference signal, and circuitry for continuously comparing the power signal with the reference signal and for generating a warning signal in response to said comparison, characterized in that said reference signal generating means is operative to increase or decrease the value of the reference signal by multiplying the reference signal by a fixed constant, the polarity of which is dependent upon the difference between the power signal and the reference signal to reduce said difference, whereby the multiplied reference signal is fed back to said reference signal generating means to generate a new reference signal describing an exponential function of the time and being applied to said circuitry, and that a warning signal source is connected to the reference signal generating means and adapted to generate a warning signal, the value of which being equal to the instant value of the reference signal multiplied by a predetermined constant factor, and a second signal comparator for comparing the power signal with said warning signal and for generating the warning signal when the value of the power signal becomes equal to or exceeds the value of the warning signal to provide a short response time to a rapid increase of the power signal.

* * * * *